(12) United States Patent
      Chida

(10) Patent No.: US 12,592,449 B2
(45) Date of Patent: Mar. 31, 2026

(54) ASSEMBLED BATTERY

(71) Applicant: VEHICLE ENERGY JAPAN INC.,
               Ibaraki (JP)

(72) Inventor: Koji Chida, Ibaraki (JP)

(73) Assignee: VEHICLE ENERGY JAPAN INC.,
               Ibaraki (JP)

( * ) Notice: Subject to any disclaimer, the term of this
              patent is extended or adjusted under 35
              U.S.C. 154(b) by 384 days.

(21) Appl. No.: 18/002,297

(22) PCT Filed: Sep. 27, 2021

(86) PCT No.: PCT/JP2021/035357
     § 371 (c)(1),
     (2) Date: Dec. 19, 2022

(87) PCT Pub. No.: WO2022/185590
     PCT Pub. Date: Sep. 9, 2022

(65) Prior Publication Data
     US 2023/0352795 A1      Nov. 2, 2023

(30) Foreign Application Priority Data
     Mar. 1, 2021      (JP) ................................. 2021-031742

(51) Int. Cl.
     H01M 50/358          (2021.01)
     H01M 50/204          (2021.01)
     (Continued)

(52) U.S. Cl.
     CPC ....... H01M 50/358 (2021.01); H01M 50/204
     (2021.01); *H01M 10/613* (2015.04);
     (Continued)

(58) Field of Classification Search
     CPC ........... H01M 10/613; H01M 2220/20; H01M
                    50/20; H01M 50/204; H01M 50/209;
     (Continued)

(56) References Cited

U.S. PATENT DOCUMENTS

| 8,927,136 B2 | 1/2015 | Kim |
| 2012/0328918 A1 | 12/2012 | Kim |

(Continued)

FOREIGN PATENT DOCUMENTS

| JP | 2000-044385 A | 2/2000 |
| JP | 2013-008673 A | 1/2013 |
| JP | 2014-072091 A | 4/2014 |

OTHER PUBLICATIONS

International Search Report, mailed Oct. 26, 2021, for International
Application No. PCT/JP2021/035357.

(Continued)

*Primary Examiner* — Lingwen R Zeng
(74) *Attorney, Agent, or Firm* — Baker Botts L.L.P.

(57) ABSTRACT

An assembled battery includes: a plurality of batteries, each
with a container that contains an electric charger/discharger
and an electrolytic solution and a gas discharge unit on its
one surface, wherein the plurality of batteries are stacked so
that the one surface of each battery is aligned to be flush with
the one surface of the other batteries; a metal first flow path
member is placed opposite the surface with the gas discharge
unit, and configures a first flow path unit for gas discharged
from the gas discharge units of the batteries; a second flow
path member that forms a second flow path unit with a
smaller flow path cross-sectional area; a connector that
couples the first and the second flow path unit via an opening
in the first flow path member; and a guide member that
partitions a space inside the connector. This configuration
allows for efficient gas discharge.

11 Claims, 5 Drawing Sheets

(51) Int. Cl.

| | |
|---|---|
| *H01M 10/613* | (2014.01) |
| *H01M 50/20* | (2021.01) |
| *H01M 50/209* | (2021.01) |
| *H01M 50/30* | (2021.01) |
| *H01M 50/35* | (2021.01) |
| *H01M 50/367* | (2021.01) |

(52) U.S. Cl.

CPC .......... *H01M 50/20* (2021.01); *H01M 50/209* (2021.01); *H01M 50/30* (2021.01); *H01M 50/35* (2021.01); *H01M 50/367* (2021.01); *H01M 2220/20* (2013.01); *Y02E 60/10* (2013.01)

(58) Field of Classification Search

CPC .... H01M 50/30; H01M 50/35; H01M 50/358; H01M 50/367; Y02E 60/10

See application file for complete search history.

(56) References Cited

U.S. PATENT DOCUMENTS

| | | |
|---|---|---|
| 2014/0093756 A1 | 4/2014 | Nemoto et al. |
| 2015/0125720 A1* | 5/2015 | Fujii ................... H01M 50/209 429/56 |

OTHER PUBLICATIONS

Extended European Search Report, mailed Oct. 8, 2024, for European Application No. 21928388.4.

* cited by examiner

ASSEMBLED BATTERY

TECHNICAL FIELD

The present invention relates an assembled battery which has flow paths for gas.

BACKGROUND ART

There is the Japanese Patent Application Laid-Open (Kokai) Publication No. 2000-044385 (PLT 1) as a background art in the present technical field. This publication describes the "provision of a gas rectifier with a simple structure which forms a uniform flow regardless of a flow speed or pressure conditions" (see its abstract).

CITATION LIST

Patent Literature

[PLT 1] Japanese Patent Application Laid-Open (Kokai) Publication No. 2000-044385

SUMMARY OF INVENTION

Technical Problem

PLT 1 equalizes a gas flow speed distribution by utilizing, for example, the lengths of a first flow path and a second flow path and a pressure difference between them. However, if these conditions cannot be satisfied, it is impossible to discharge the gas efficiently. For example, with an assembled battery which adapts a structure to aggregate, at the first flow path, gases discharged respectively from a plurality of battery cells and make the aggregated gases flow to the second flow path, it is difficult to secure a sufficient length of the first flow path. Furthermore, if any space located off an ideal flow path exists at a connector between the first flow path and the second flow path, the gas is retained in that space, thereby causing degradation of the discharge efficiency. In order to form the first flow path and the second flow path so that no space will be generated other than the ideal flow path, high processing machining precision is required and restrictions on materials and construction methods arise.

Accordingly, depending on the structure, material(s), and machining method to be selected, the gas may not be sufficiently discharged out of the flow path units as the gas may be retained because of, for example, swirling in the middle of the flow path members when being discharged.

It is an object of the present invention to provide an assembled battery which discharges the gas efficiently.

Solution to Problem

In order to solve the above-described problem, for example, the configuration described in the claims is adapted.

The present application includes a plurality of means for solving the above-described problem and one example of such means is an "assembled battery including: a plurality of batteries, each of which has a container that contains an electric charger/discharger and an electrolytic solution and is provided with a gas discharge unit on its one surface, wherein the plurality of batteries are stacked so that the one surface of each battery is aligned to be flush with the one surface of each of other batteries; a first flow path member that is made of metal, is placed opposite the surface where the gas discharge unit is provided, and configures a first flow path unit which is a flow path for a gas discharged from the gas discharge unit of each of the plurality of batteries; a second flow path member that forms a second flow path unit with a smaller flow path cross-sectional area than that of the first flow path unit; a connector that couples the first flow path unit and the second flow path unit together via an opening; and a guide member that partitions a space inside the connector and facing the opening.

Advantageous Effect of Invention

The assembled battery which efficiently discharges the gas can be provided according to the present invention.

DESCRIPTION OF EMBODIMENTS

Embodiments will be explained with reference to the drawings.

An explanation will be provided below about embodiments applied to an assembled battery used for, as an example, an electric storage apparatus which configures a power source for hybrid electric vehicles (HEVs). Incidentally, the assembled battery according to the following embodiments can be also applied to a power source for industrial vehicles like passenger cars such as EVs or hybrid railway vehicles, other than HEVs. Lithium-ion batteries, nickel-hydrogen batteries, and so on can be used as the assembled battery.

The assembled battery is configured such that a plurality of battery cells (single batteries) capable of accumulating and discharging electrical energy by means of electric charging/discharging of a direct current are serially connected. The specifications of the individual single battery are not particularly limited; however, for example, an output voltage is from approximately 3.0 [V] to approximately 4.2 [V] and an average output voltage is approximately 3.6 [V].

The assembled battery is configured such that the plurality of battery cells are connected serially, for example, via a busbar to configure a battery group and a plurality of battery groups are connected serially, for example, via a busbar. There are no particular limitations regarding, for example, the number of battery groups included in the assembled battery, a battery group connection method, for example, serial or parallel connection, and the number of battery cells included in each battery group.

Embodiment 1

Figure 1:
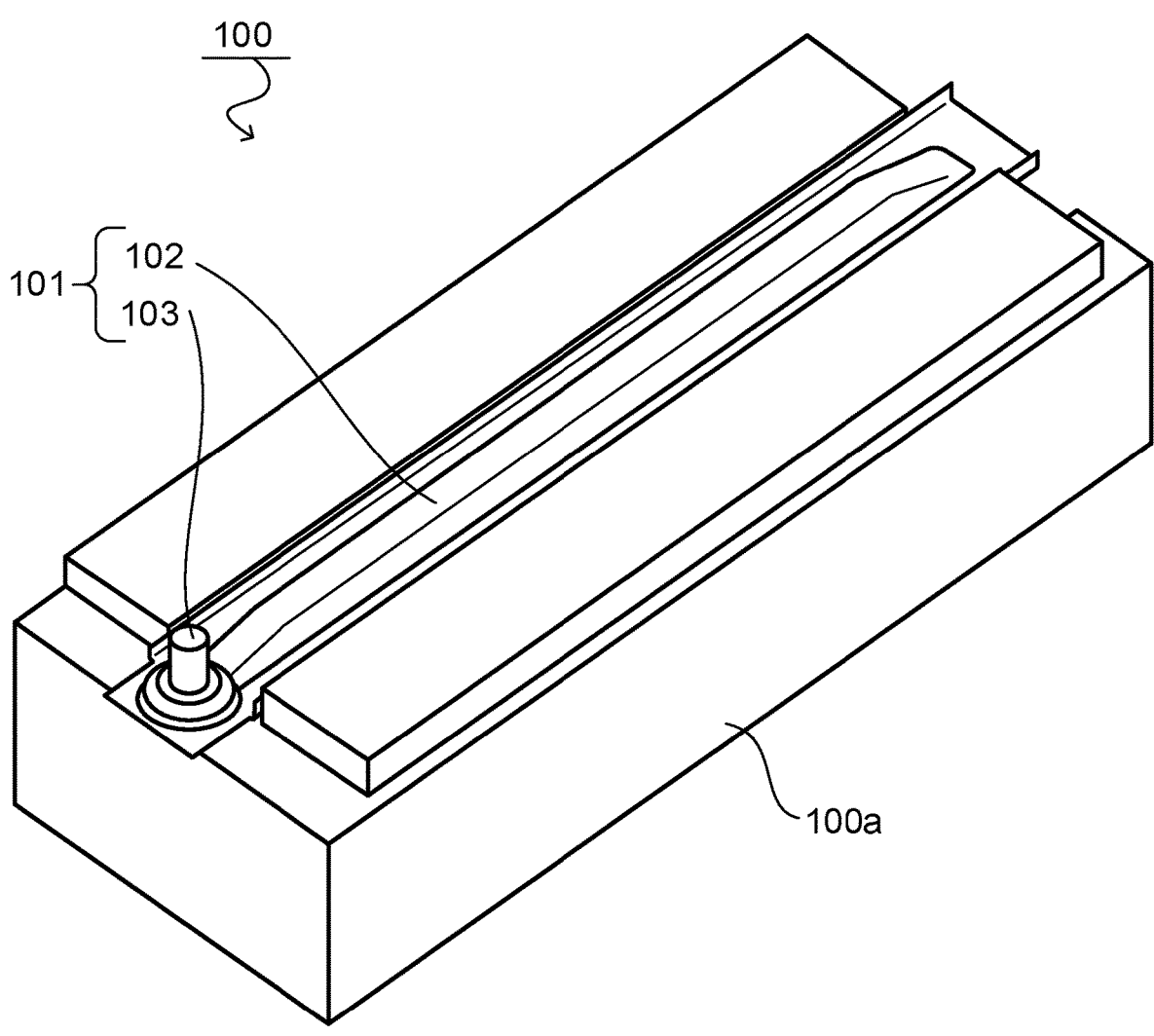
FIG. 1 is a schematic diagram of an assembled battery equipped with a gas duct.

FIG. 1 is an example of a configuration diagram of an assembled battery equipped with a gas duct according to this embodiment. An assembled battery 100 according to this embodiment is designed such that a first flow path member 102 is assembled with an assembled battery body 100*a* and a cylindrical second flow path member 103 is fixed to an end of the first flow path member 102.

The assembled battery body 100*a* is formed by stacking a plurality of battery cells in a longitudinal direction of the first flow path member 102. Each battery cell has a container (case) which contains an electric charger/discharger (a wound group including a positive electrode, a separator, and a negative electrode) and an electrolytic solution, and on one surface of which a gas discharge unit is provided, and the battery cells are stacked in such a manner that the one surface of each battery cell on which the gas discharge unit is provided is aligned to be flush with one surface of each of other battery cells.

The first flow path member 102 covers an upper part of the gas discharge unit of each battery cell, thereby forming a first flow path unit. Moreover, the inside of the second flow path member 103 is a second flow path unit with a smaller flow path cross-sectional area than that of the first flow path unit; and a gas duct 101 is formed by the first flow path unit and the second flow path unit. Specifically speaking, the gas discharged from each battery cell of the assembled battery body 100*a* passes through the first flow path unit and then the second flow path unit and is discharged outside.

The second flow path member 103 is made of, for example, metal and is joined to the first flow path member 102 by welding. Alternatively, the second flow path member 103 may be made of resin and may be joined to the first flow path member 102 by fusion bonding.

The second flow path member 103 extends, for example, along a normal direction of the surface on which the gas discharge unit is provided, and extends in a direction away from the first flow path member 102.

Figure 2:
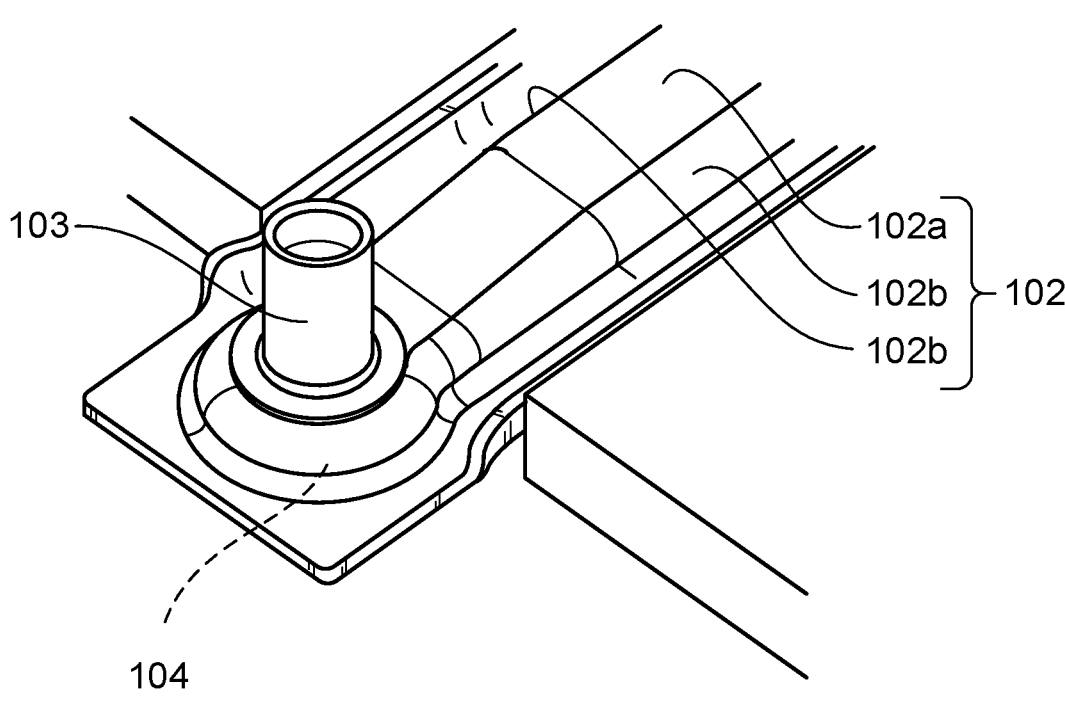
FIG. 2 is a perspective view of a gas duct structure composed of a first flow path unit and a second flow path unit.
Figure 3:
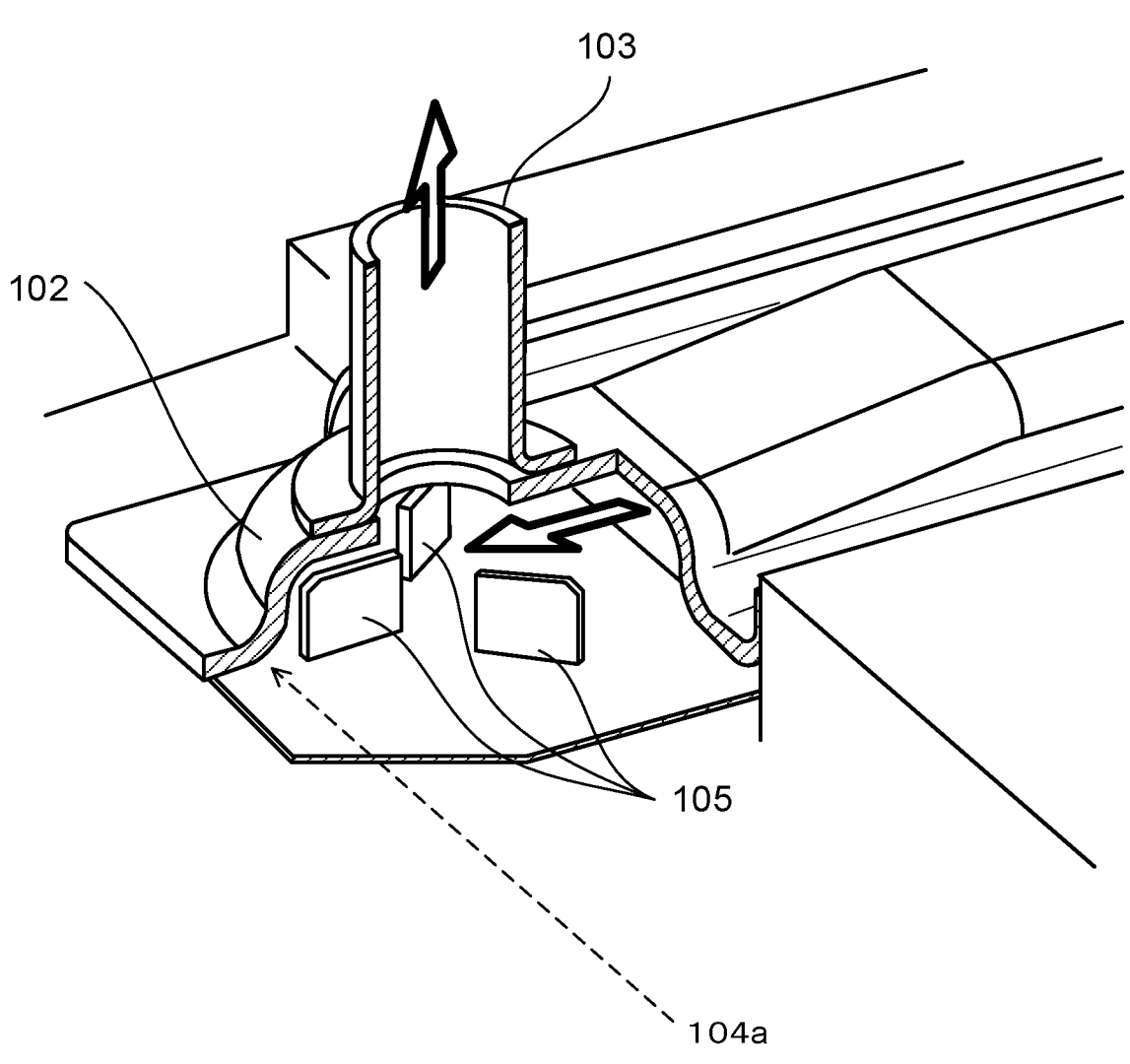
FIG. 3 is a partly sectional view of the gas duct structure according to Embodiment 1.

FIG. 2 is a perspective view of a gas duct structure composed of the first flow path unit and the second flow path unit. Moreover, FIG. 3 is a partly sectional view of the gas duct structure according to Embodiment 1. The first flow path member 102 illustrated in FIG. 2 and FIG. 3 is, for example, a metal plate with a uniform thickness and is formed by sheet metal processing.

The first flow path member 102 includes: a principal surface part 102*a* facing opposite the gas discharge unit of each battery cell; and a pair of side surface parts 102*b* which extend from both ends of the principal surface part 102*a* along the longitudinal direction, and extend on the same side as the principal surface part 102*a* and in a direction intersecting with the principal surface part 102*a*.

A space partitioned by the principal surface part 102*a* and the pair of side surface parts 102*b* constitutes the first flow path unit which is a gas flow path facing opposite the surface where the gas discharge unit is provided.

Furthermore, sheet metal bending processing is applied to a longer-side end of the first flow path member 102. This shape enhances the stiffness of the first flow path member 102 and makes it easier to position the first flow path member 102.

A connector 104 for coupling to the second flow path unit via the opening is provided at one longitudinal-direction end of the first flow path unit. The connector 104 and the opening are formed by, for example, punching an area in the vicinity of the longitudinal-direction end of the first flow path member 102. This processing bends or flexes the area in the vicinity of the end of the first flow path member 102, thereby forming a dome shape, and forms an opening in a central part of the dome shape.

In other words, the connector 104 is the space partitioned by the dome shape of the first flow path member 102 and the one surface of the assembled battery body 100*a* and is the end of the first flow path unit. Moreover, since the opening is located at the center of the dome shape, the opening is formed at a position away from a longitudinal-direction endmost part 104*a* of the first flow path unit in the connector 104.

In the connector 104, a flow path from the gas discharge unit side to the second flow path unit is an ideal flow path. However, with the structure where the connector 104 is in the dome shape and the opening is located at its central part, a space exists off the ideal flow path, which causes a swirling flow of the gas to be generated in that space and impedes smooth discharge of the gas, thereby degrading the discharge efficiency.

So, in this Embodiment 1, a guide member for partitioning the space facing the opening inside the connector is provided to prevent the swirling of the gas.

Referring to FIG. 3, three guide members 105 are fixed to, or are molded integrally with, the assembled battery body 100*a*. Each of the three guide members 105 is formed in a plate shape and has a face extending along a flow path direction of the second flow path member. Moreover, in FIG. 3, the three guide members 105 are arranged radially inside the dome shape.

This guide member 105 suppresses retention of the gas caused by, for example, swirling in the part between the first flow path member and the second flow path member upon discharging of the gas. Also, the flow direction of the gas is regulated by the guide member.

Therefore, the gas can be efficiently discharged out of the second flow path member.

Embodiment 2

Figure 4:
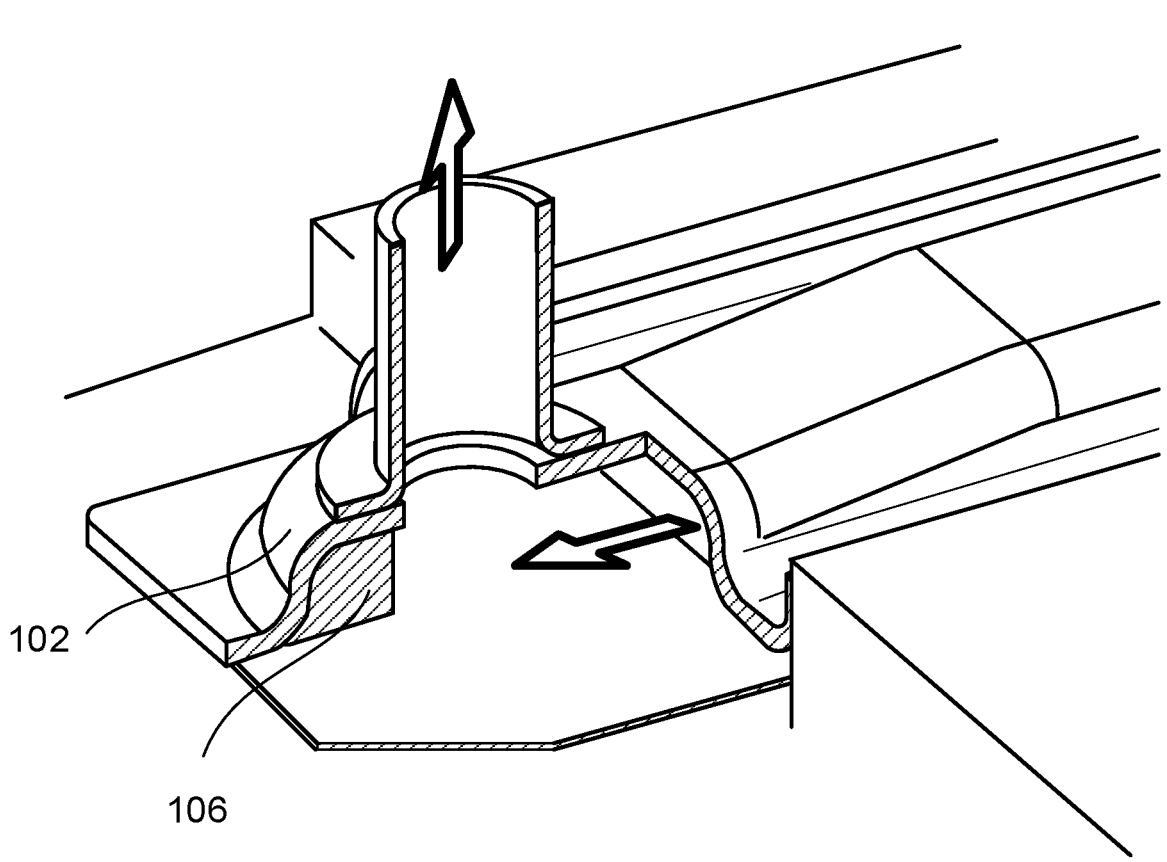
FIG. 4 is a partly sectional view of the gas duct structure according to Embodiment 2.

FIG. 4 is a partly sectional view of a gas duct structure according to Embodiment 2.

While the three guide members 105 are fixed to the assembled battery body 100*a* in Embodiment 1, a guide member 106 illustrated in this Embodiment 2 is joined to an inner surface of the first flow path member 102. By joining the guide member 106 to the inner surface of the first flow path member 102 as described above, the shape of an ideal flow path can be easily realized and the gas can be efficiently discharged outside.

FIG. 4 illustrates an example of the configuration where the guide member 106 is joined to the inner surface of the first flow path member 102; however, the guide member 106 may be formed integrally with the inner surface of the first flow path member 102. Furthermore, a configuration of joining the guide member to an end of the second flow path member 103 or a configuration of forming the guide member integrally with the end of the second flow path member 103 may be employed.

(Variation)

Figure 5:
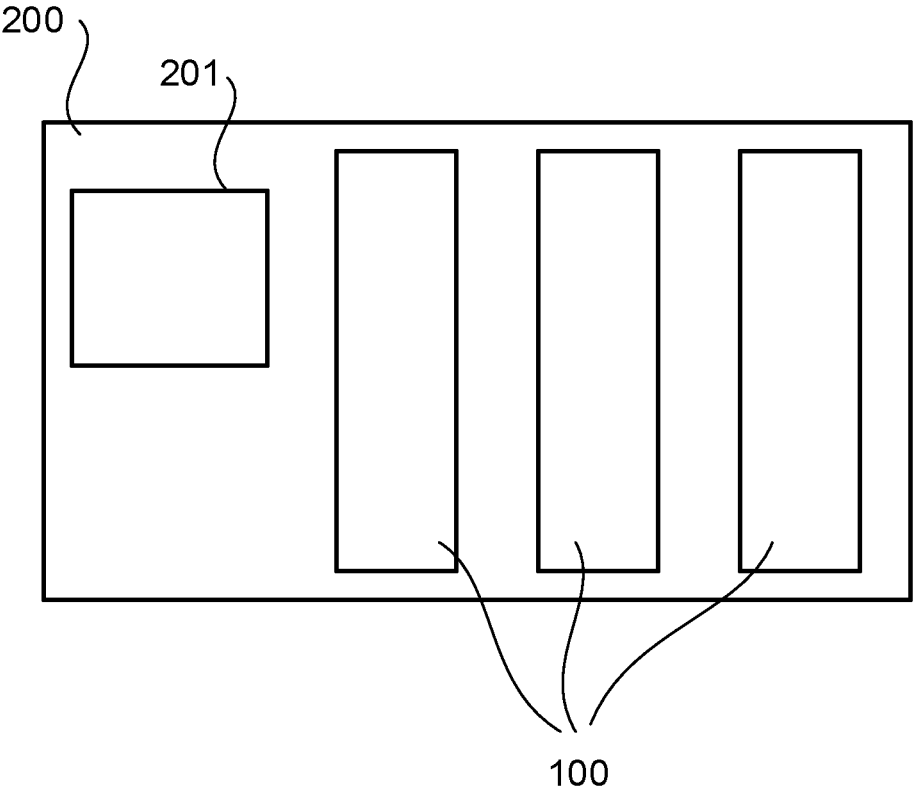
FIG. 5 is an explanatory diagram of a configuration example of the assembled battery.

FIG. 5 is an explanatory diagram of a configuration example of the assembled battery 100. A much larger assembled battery 200 may be formed by combining a plurality of assembled batteries 100 explained in each of the above-described embodiments as illustrated in FIG. 5. The assembled battery 200 has a plurality of assembled batteries 100 and a controller 201. Accordingly, the assembled battery 100 disclosed in each of the above-described embodiments can be applied to any arbitrary use other than the use to be mounted in the much larger assembled battery 200.

The assembled battery 100 according to each of the aforementioned embodiments includes, as described above: a plurality of batteries, each of which has a container that contains an electric charger/discharger and an electrolytic solution and is provided with a gas discharge unit on its one surface, wherein the plurality of batteries are stacked so that the one surface of each battery is aligned to be flush with the one surface of each of other batteries; the first flow path member 102 that is made of metal, is placed opposite the surface where the gas discharge unit is provided, and configures a first flow path unit which is a flow path for a gas discharged from the gas discharge unit of each of the plurality of batteries; the second flow path member 103 that forms a second flow path unit with a smaller flow path cross-sectional area than that of the first flow path unit; the connector that couples the first flow path unit and the second flow path unit together via the opening; and the guide members 105 and 106 that partition a space inside the connector and facing the opening.

The above-described configuration suppresses retention of the gas caused by, for example, swirling in the part between the first flow path member and the second flow path member upon discharging of the gas. Also, the gas flow direction is regulated by the guide member.

Therefore, the gas can be efficiently discharged out of the second flow path member.

Moreover, the first flow path member 102 is configured such that its part including the opening is formed in a dome shape and the circumference of the opening is bent or flexed. Specifically speaking, the assembled battery which discharges the gas efficiently can be provided even when the first flow path, the connector, and the opening are formed at low cost by the sheet metal processing.

Furthermore, the guide member 105 according to Embodiment 1 is formed in a plate shape and its side surface has a face extending along the flow path direction of the second flow path unit. The above-described configuration can suppress swirling of the gas and guide the gas to the second flow path. Incidentally, the shape of the guide member 105 is not limited to the plate shape and can be any arbitrary shape such as a hemispherical shape or a columnar shape.

Furthermore, the guide member 106 according to Embodiment 2 is joined to, or is formed integrally with, the inner surface of the first flow path member 102. The above-described configuration can make it possible to easily realize the shape of the ideal flow path and efficiently discharge the gas out of the second flow path member 103.

Furthermore, the guide member may be joined to an end of the second flow path member 103 or may be formed integrally with the end of the second flow path member. In this case, it is also possible to easily realize the shape of the ideal flow path and efficiently discharge the gas out of the second flow path member 103.

Furthermore, as an example, the second flow path member 103 is made of metal and is joined to the first flow path member 102 by welding. Alternatively, the second flow path member 103 is made of resin and is joined to the first flow path member 102 by fusion bonding.

Accordingly, regarding the present invention, there is no limitation of materials for the second flow path member 103 and any arbitrary material(s) can be used.

Furthermore, as an example, the second flow path member 103 extends along the normal direction of the one surface and in the direction away from the first flow path member. The above-described configuration can discharge the gas efficiently with a simple configuration.

Furthermore, the guide member is not limited to the aforementioned embodiments and an arbitrary number of the guide member(s) can be provided and they can be installed at any arbitrary place(s). Specifically speaking, the assembled battery can include one guide member or a plurality of guide members at one place or a plurality of places from among the assembled battery body, the first flow path member, and the second flow path member.

Incidentally, each of the aforementioned embodiments do not limit the present invention and the present invention can be implemented by changing the exemplified configuration as necessary. Furthermore, the present invention can be used for any arbitrary purposes including the exemplified assembled battery.

REFERENCE SIGNS LIST

100, 200: assembled battery
100a: assembled battery body
101: gas duct
102: first flow path member
103: second flow path member
104: connector
105, 106: guide members
201: controller

The invention claimed is:

1. An assembled battery comprising:

a plurality of batteries, each of which has a container that contains an electric charger/discharger and an electrolytic solution and is provided with a gas discharge unit on its one surface, wherein the plurality of batteries are stacked so that the one surface of each battery is aligned to be flush with the one surface of each of other batteries;

a first flow path member that is made of metal, is placed opposite the surface where the gas discharge unit is provided, and configures a first flow path unit which is a flow path for a gas discharged from the gas discharge unit of each of the plurality of batteries;

a second flow path member that forms a second flow path unit with a smaller flow path cross-sectional area than that of the first flow path unit;

a connector that couples the first flow path unit and the second flow path unit together via an opening;

a guide member that partitions a space inside the connector and facing the opening; and wherein the first flow path member is designed so that a part including the opening is formed in a dome shape and a circumference of the opening is bent or flexed.

2. The assembled battery according to claim 1, wherein the guide member is formed in a plate shape, a hemispherical shape, or a columnar shape and has a face extending along a flow path direction of the second flow path unit.

3. The assembled battery according to claim 1, wherein the guide member is joined to an inner surface of the first flow path member or is formed integrally with the inner surface.

4. The assembled battery according to claim 1, wherein the guide member is joined to an end of the second flow path member or is formed integrally with the end of the second flow path member.

5. The assembled battery according to claim 1, wherein the second flow path member is made of metal and is joined to the first flow path member by welding.

6. The assembled battery according to claim 1,
wherein the second flow path member is made of resin
and is joined to the first flow path member by fusion
bonding.

7. The assembled battery according to claim 1,
wherein the second flow path member extends along a
normal direction of the one surface and extends in a
direction away from the first flow path member.

8. The assembled battery according to claim 1,
wherein the guide member is provided singularly or in
plurality at one or a plurality of places among an
assembled battery body, the first flow path member, and
the second flow path member.

9. The assembled battery according to claim 1,
wherein the guide member is formed in a plate shape, a
hemispherical shape, or a columnar shape and has a
face extending along a flow path direction of the second
flow path unit.

10. The assembled battery according to claim 1,
wherein the guide member is joined to an inner surface of
the first flow path member or is formed integrally with
the inner surface.

11. The assembled battery according to claim 1,
wherein the guide member is joined to an end of the
second flow path member or is formed integrally with
the end of the second flow path member.

\* \* \* \* \*